United States Patent
Palanki

(10) Patent No.: US 8,787,384 B2
(45) Date of Patent: Jul. 22, 2014

(54) PRE-EMPTIVE ACKNOWLEDGEMENT FOR DATA TRANSMISSION IN A COMMUNICATION SYSTEM

(75) Inventor: Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 909 days.

(21) Appl. No.: 12/115,231

(22) Filed: May 5, 2008

(65) Prior Publication Data

US 2009/0274139 A1    Nov. 5, 2009

(51) Int. Cl.
H04L 12/28    (2006.01)
H04L 1/18    (2006.01)

(52) U.S. Cl.
CPC .................. H04L 1/1854 (2013.01)
USPC .......................................... 370/394

(58) Field of Classification Search
USPC .................................. 370/349, 394
See application file for complete search history.

(56) References Cited

U.S. PATENT DOCUMENTS

| | | | |
|---|---|---|---|
| 5,983,383 A | 11/1999 | Wolf | |
| 7,042,869 B1 * | 5/2006 | Bender | 370/349 |
| 7,236,740 B2 * | 6/2007 | Koo et al. | 455/13.4 |
| 7,734,987 B2 * | 6/2010 | Kaburaki et al. | 714/774 |
| 2002/0012337 A1 * | 1/2002 | Schmidl et al. | 370/349 |
| 2002/0080802 A1 | 6/2002 | Sachs et al. | |
| 2003/0076810 A1 * | 4/2003 | Rezaiifar et al. | 370/349 |
| 2003/0112747 A1 | 6/2003 | Suzuki et al. | |
| 2004/0093548 A1 * | 5/2004 | Heo et al. | 714/749 |
| 2004/0123211 A1 * | 6/2004 | Kozintsev et al. | 714/749 |
| 2004/0141525 A1 * | 7/2004 | Bhushan et al. | 370/473 |
| 2004/0228320 A1 * | 11/2004 | Laroia et al. | 370/349 |
| 2006/0072533 A1 * | 4/2006 | Smee et al. | 370/342 |
| 2007/0110095 A1 | 5/2007 | Attar et al. | |
| 2007/0124657 A1 | 5/2007 | Orio | |
| 2007/0253393 A1 * | 11/2007 | Tseng | 370/338 |
| 2008/0102898 A1 * | 5/2008 | Na et al. | 455/562.1 |
| 2008/0137689 A1 * | 6/2008 | Shiizaki et al. | 370/498 |
| 2008/0232403 A1 * | 9/2008 | Tsai et al. | 370/473 |
| 2009/0207818 A1 * | 8/2009 | Tsai et al. | 370/338 |

FOREIGN PATENT DOCUMENTS

| | | |
|---|---|---|
| JP | 07123079 | 5/1995 |
| JP | 2007142622 A | 6/2007 |
| WO | WO-9832231 A1 | 7/1998 |
| WO | 02065734 A1 | 8/2002 |
| WO | WO2006118629 A1 | 11/2006 |

OTHER PUBLICATIONS

International Search Report and Written Opinion—PCT/US2009/042821, International Search Authority—European Patent Office—Mar. 11, 2009.

* cited by examiner

*Primary Examiner* — Shaq Taha
(74) *Attorney, Agent, or Firm* — Donald C. Kordich

(57) ABSTRACT

Techniques for sending acknowledgement (ACK) information for data transmission are described. In one design, a receiver receives a transmission of data, processes the received transmission to decode the data, and generates ACK information for the data prior to decoding all of the data. The receiver may generate the ACK information based on decoding results for a portion of the data and/or received signal quality of the received transmission. The receiver may send the ACK information at a designated ACK transmission time prior to completing decoding for all of the data. The receiver may receive a transmission of multiple (K) packets and may generate ACK information for these K packets after decoding L packets, where $1 \leq L < K$. The receiver may set the ACK information to an ACK if all L packets are decoded correctly or to a NAK if any one of the L packets is decoded in error.

40 Claims, 8 Drawing Sheets

PRE-EMPTIVE ACKNOWLEDGEMENT FOR DATA TRANSMISSION IN A COMMUNICATION SYSTEM

BACKGROUND

I. Field

The present disclosure relates generally to communication, and more specifically to techniques for acknowledging data transmission in a communication system.

II. Background

In a communication system, a transmitter may encode and modulate data and then send a transmission of the data to a receiver. The receiver may receive the transmission from the transmitter, demodulate and decode the received transmission, and send an acknowledgement (ACK) if the data is decoded correctly or a negative acknowledgement (NAK) if the data is decoded in error. The transmitter may resend the data if a NAK is received and may send new data if an ACK is received. It may be desirable to send ACK information (e.g., ACK or NAK) in a manner to achieve good performance.

SUMMARY

Techniques for sending pre-emptive ACK information for data transmission are described herein. Pre-emptive ACK information is ACK information that is generated for data prior to decoding all of the data. Pre-emptive ACK information may be used to reduce ACK feedback latency, increase decoding throughput, and improve performance.

In one design, a receiver (e.g., a terminal) may receive a transmission of data and may process the received transmission to decode the data. The receiver may generate ACK information for the data prior to decoding all of the data. The receiver may generate the ACK information based on decoding results for a portion of the data, estimated received signal quality for the received transmission, estimated capacity, etc. The receiver may send the ACK information at a designated ACK transmission time prior to completing decoding for all of the data.

In one design, the receiver may receive a transmission of multiple (K) packets and may generate ACK information for these packets prior to decoding all of the packets. The receiver may generate the ACK information after decoding L packets, where in general $1 \leq L < K$. The receiver may set the ACK information to an ACK if all L packets are decoded correctly or to a NAK if any one of the L packets is decoded in error. The L packets may include a single packet decoded first among the K packets, all packets decoded prior to the ACK transmission time, a predetermined number of packets, etc. A transmitter (e.g., a base station) may process and send the K packets such that they have similar probability of correct decoding. The decoding results for the L packets may then accurately reflect the likely decoding results for the remaining packets.

In another aspect, the receiver may receive a transmission of K packets, decode a packet in error, and skip decoding for remaining packets. If the K packets have similar probability of correct decoding and the receiver encounters a decoding error for a packet, then the likelihood of decoding a remaining packet in error may be great. The receiver may conserve decoding resources as well as battery power by not decoding the remaining packets after encountering a decoding error. The receiver may wait for another transmission of the remaining packets and then decode these packets.

Various aspects and features of the disclosure are described in further detail below.

DETAILED DESCRIPTION

The techniques described herein may be used for various wireless and wireline communication systems. The terms "system" and "network" are often used interchangeably. For example, the techniques may be used for wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.16, IEEE 802.20, Flash-OFDM®, etc. Long Term Evolution (LTE) uses E-UTRA, which employs OFDMA on the downlink and SC-FDMA on the uplink. UTRA, E-UTRA and LTE are described in documents from an organization named "3rd Generation Partnership Project" (3GPP). cdma2000 and UMB are described in documents from an organization named "3rd Generation Partnership Project 2" (3GPP2). The techniques may also be used for local area networks (LANs), wireless local area networks (WLANs), and other networks. The techniques may also be used for communication between two devices via a wireless or wireline communication link. For clarity, certain aspects of the techniques are described below for a wireless communication system.

Figure 1:
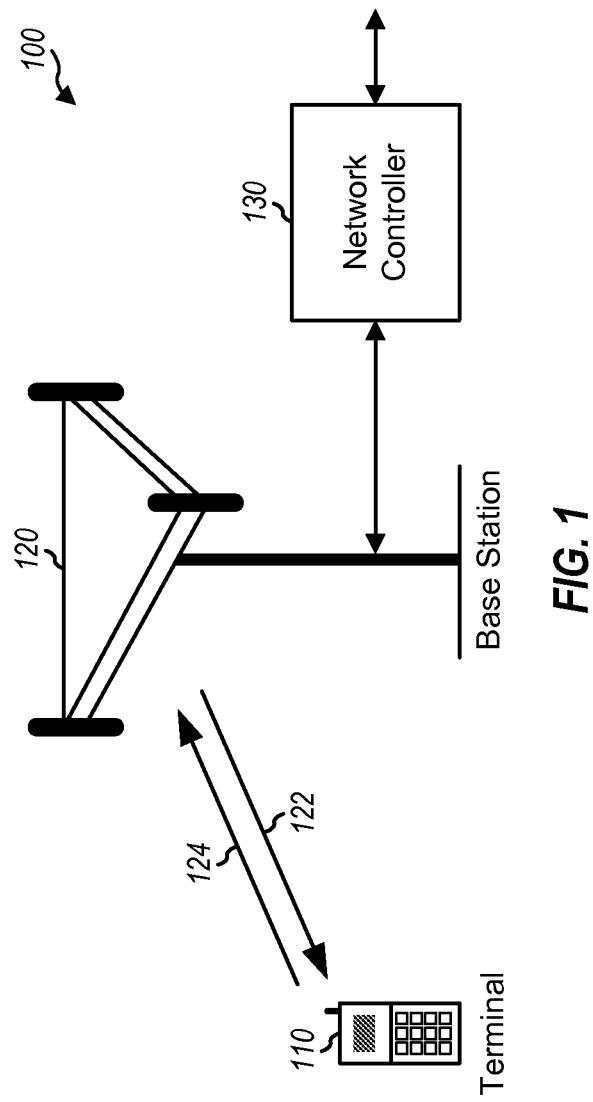
FIG. 1 shows a wireless communication system.

FIG. 1 shows a wireless communication system 100, which may also be referred to as an access network (AN). For simplicity, only one terminal 110, one base station 120, and one network controller 130 and are shown in FIG. 1. Base station 120 is generally a fixed station that communicates with the terminals and may also be referred to as an access point, a Node B, an evolved Node B, etc. Network controller 130 may provide coordination and control for base station 120 and other base stations coupled to the network controller.

Terminal 110 may be stationary or mobile and may also be referred to as an access terminal (AT), a mobile station, a user equipment, a user terminal, a subscriber unit, a station, etc. Terminal 110 may be a cellular phone, a personal digital assistant (PDA), a wireless communication device, a wireless modem, a handheld device, a laptop computer, etc. Terminal 110 may communicate with base station 120 via a forward link 122 and a reverse link 124. The forward link (or downlink) refers to the communication link from the base station to the terminal, and the reverse link (or uplink) refers to the communication link from the terminal to the base station. The techniques described herein may be used for data transmission on the forward link as well as the reverse link. For clarity, certain aspects of the techniques are described below for data transmission on the reverse link. The techniques may also be used for systems utilizing time division duplexing (TDD) as well as systems utilizing frequency division duplexing (FDD).

Figure 2A:
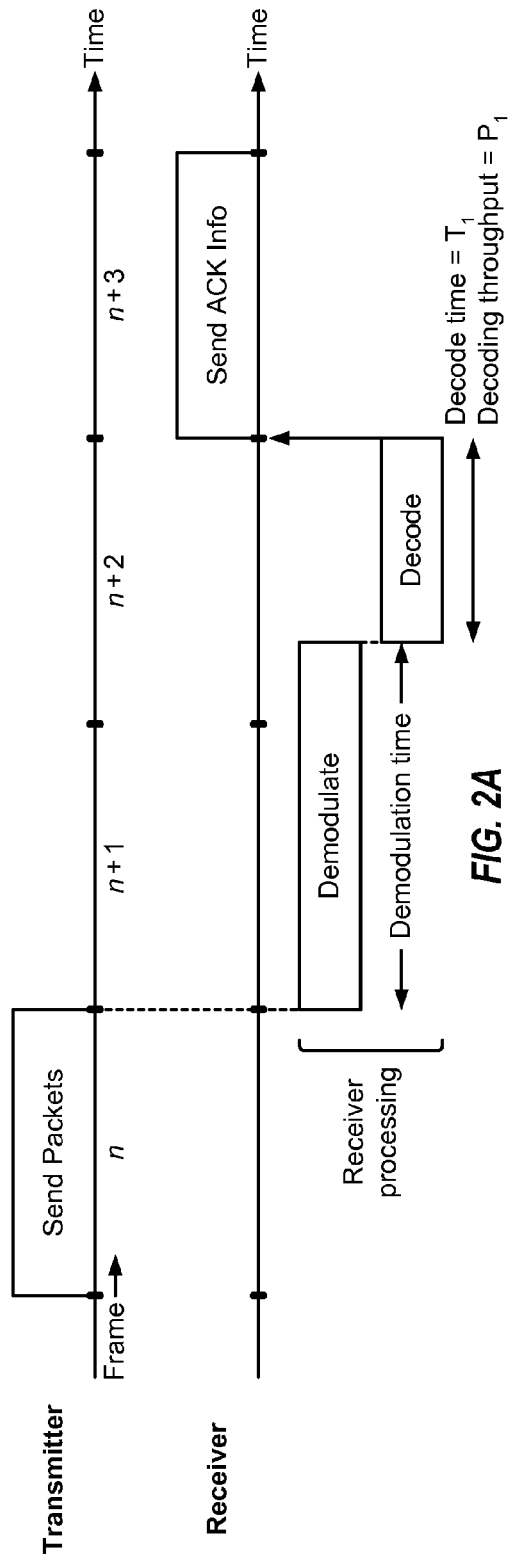
FIG. 2A shows data transmission without pre-emptive ACK information.

FIG. 2A shows an example data transmission with acknowledgement. The transmission time line may be partitioned into units of frames, which may also be referred to as radio frames, physical layer (PHY) frames, etc. Each frame may have a fixed or configurable duration.

A transmitter (e.g., terminal 110) may encode and modulate one or more (K) packets and may send a transmission of the K packets in frame n. A packet may also be referred to as a data packet, a PHY packet, a subpacket, a transport block, a data block, a codeword, a code block, etc. A receiver (e.g., base station 120) may receive the transmission from the transmitter, demodulate the received transmission, and decode the demodulated data to obtain K decoded packets. The receiver may then send an ACK in frame n+3 if the K packets are decoded correctly or may send a NAK if any packet is decoded in error. The transmitter may send another transmission of the K packets if a NAK is received and may send a transmission of new packets if an ACK is received.

In general, the receiver may send a single ACK or NAK for all packets or an individual ACK or NAK for each packet. In the description herein, ACK information may comprise a single ACK or NAK for all packets, an individual ACK or NAK for each packet, information indicative of actual decoding results for one or more packets, information indicative of predicted decoding results for one or more packets, or some other information useful for the transmitter to determine whether or not to resend one or more packets. For clarity, much of the description below assumes the use of a single ACK or NAK for all packets.

In the example shown in FIG. 2A, there is a delay of three frames from the data transmission in frame n to the ACK transmission in frame n+3. In general, the ACK transmission may be delayed by any amount from the data transmission. The amount of delay for the ACK transmission may be specified by the system and may be selected to provide good performance.

As shown in FIG. 2A, the amount of time available to the receiver to process the received transmission is dependent on the amount of delay for the ACK transmission. The receiver may first demodulate the received transmission and then decode the demodulated data. The amount of time for demodulation is referred to as demodulation time, and the amount of time for decoding is referred to as decoding time. The demodulation time and the decoding time may be dependent on various factors such as the number of packets sent, how the packets are sent, the demodulation and decoding resources at the receiver, etc. For a given amount of decoding resources at the receiver, the amount of data that can be decoded is proportional to the decoding time. In the example shown in FIG. 2A, the decoding time is $T_1$ seconds, and the decoding throughput is $P_1$, where $P_1 \approx \beta * T_1$ and $\beta$ is a scaling factor. As shown in FIG. 2A, the amount of data that can be sent in each frame may be limited by the decoding throughput at the receiver.

In an aspect, pre-emptive ACK information may be used to target low ACK feedback latency and improve performance. The receiver may generate and send pre-emptive ACK information prior to decoding all K packets, which may improve throughput as illustrated by the following example.

Figure 2B:
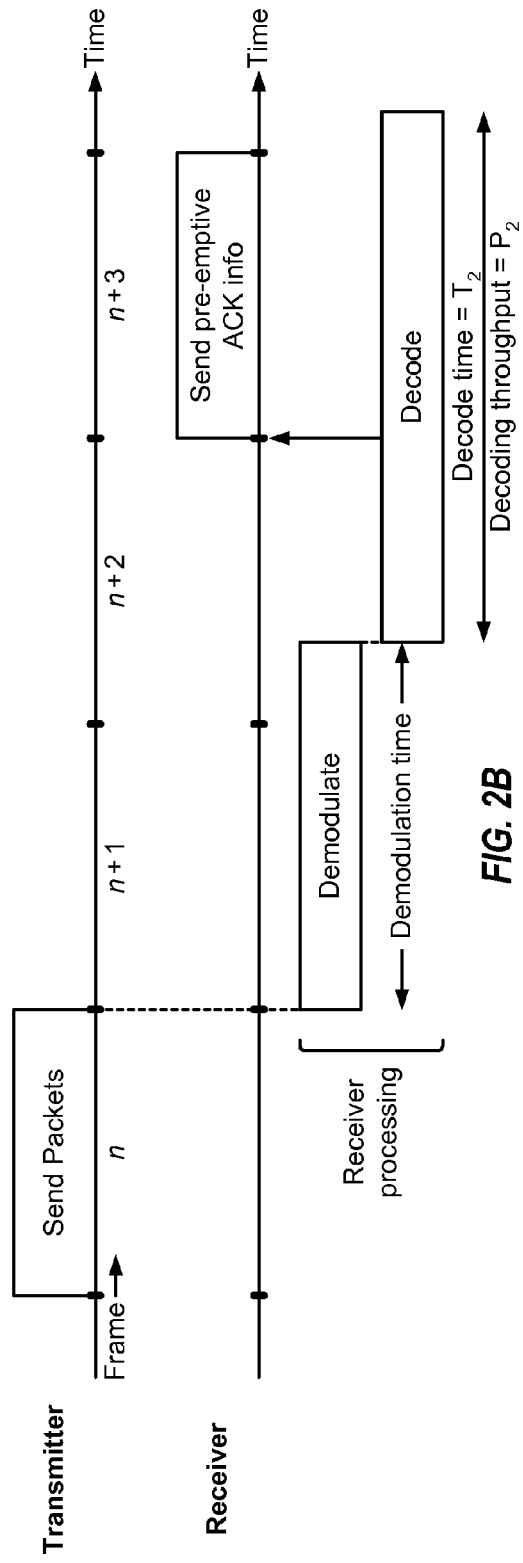
FIG. 2B shows data transmission with pre-emptive ACK information.

FIG. 2B shows an example data transmission with pre-emptive ACK information. In this example, the transmitter may encode and modulate K packets and may send a transmission of the K packets in frame n. The receiver may receive the transmission from the transmitter, demodulate the received transmission, and decode the demodulated data.

The transmitter may send more data than the receiver can decode prior to the ACK transmission time, which is the frame in which the receiver sends ACK information. The receiver may generate pre-emptive ACK information based on the available decoding results and send the pre-emptive ACK information in frame n+3. The pre-emptive ACK information may comprise an ACK if the K packets are likely to be decoded correctly or a NAK otherwise. The receiver may continue to decode the remaining packets after sending the pre-emptive ACK information. The transmitter may send another transmission of the K packets or may send a transmission of new packets based on the pre-emptive ACK information received from the receiver.

As shown in FIG. 2B, the ability to send pre-emptive ACK information may allow the receiver to have more decoding time since the decoding does not need to be completed at the time the pre-emptive ACK information is sent. In the example shown in FIG. 2B, the decoding time is $T_2$ seconds, and the decoding throughput is $P_2$, where $P_2 \approx \beta * T_2$. Since the decoding time $T_2$ in FIG. 2B is longer than the decoding time $T_1$ in FIG. 2A, the decoding throughput $P_2$ with pre-emptive ACK information is greater than the decoding throughput $P_1$ without pre-emptive ACK information. Hence, throughput and performance may be improved with the use of pre-emptive ACK information. The use of pre-emptive ACK information may be especially beneficial for systems supporting high data rates and may also be especially desirable for data transmission on the forward link to allow terminal 110 to support high data rates with limited decoding resources.

Figure 3:
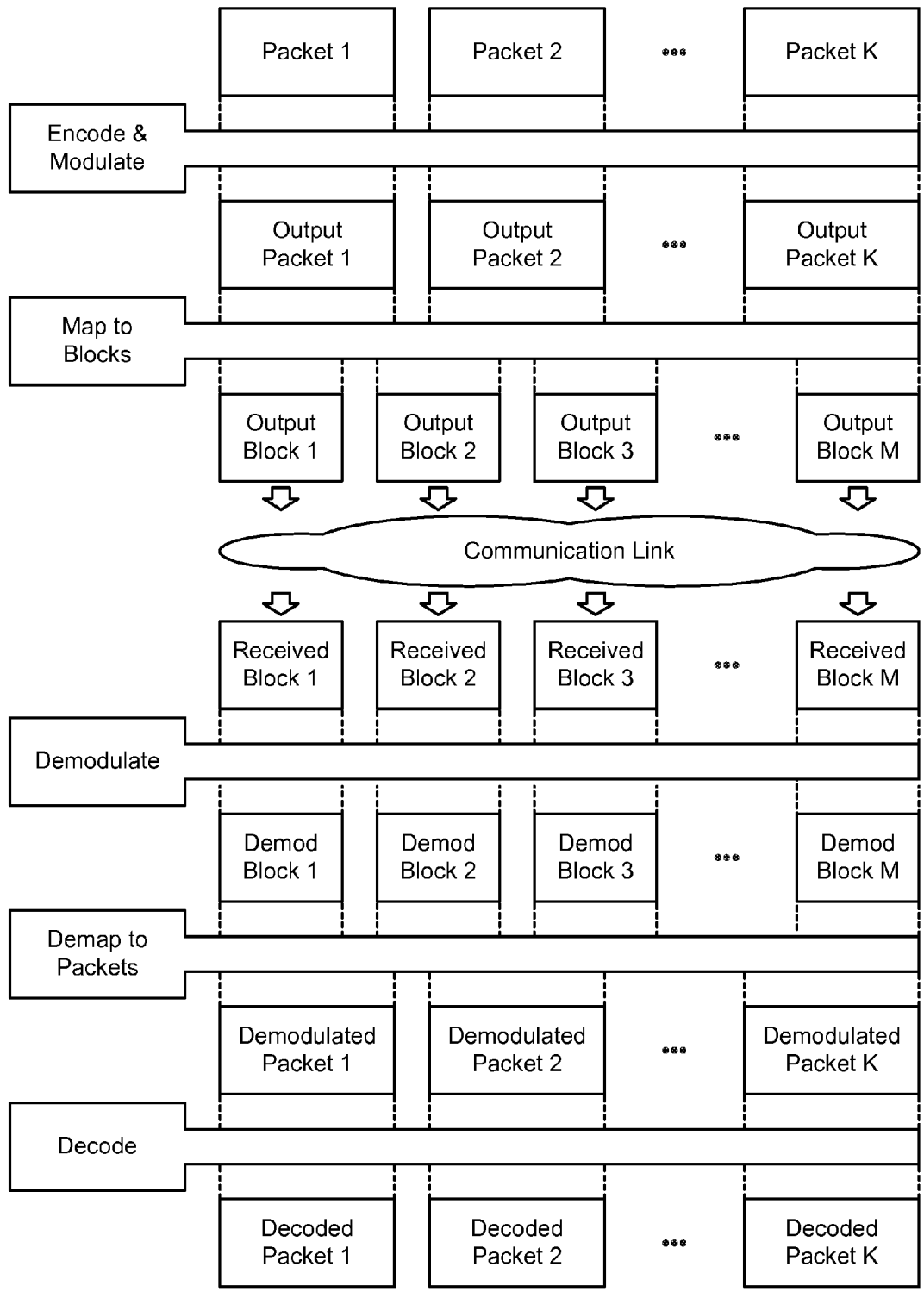
FIG. 3 shows an example of transmission and reception of K packets.

FIG. 3 shows a design of transmission and reception of packets. The transmitter may receive K packets to send in a frame, where in general K≥1. The transmitter may generate and append a cyclic redundancy check (CRC) to each packet to allow the receiver to determine whether the packet is decoded correctly or in error. The transmitter may encode and modulate each packet in accordance with a modulation and coding scheme to obtain a corresponding output packet. The transmitter may use the same modulation and coding scheme for all K packets. However, the transmitter may encode each packet separately, and the receiver may decode each packet separately. The transmitter may map the K output packets to M output blocks, where in general M≥1. An output block may also be referred to as a tile (in UMB), a resource block (in E-UTRA), etc. Each output block may include data symbols from one or more output packets as well as pilot symbols. The transmitter may further process and transmit the M output blocks via a communication link. The transmitter may also generate multiple orthogonal frequency division multiplexing (OFDM) symbols containing the K packets and a common pilot channel.

The receiver may receive and process the transmission from the transmitter to obtain M received blocks for the M output blocks. The receiver may demodulate each received block to obtain a corresponding demodulated (demod) block. The receiver may demap the demodulated blocks in a manner complementary to the mapping performed by the transmitter to obtain K demodulated packets. The receiver may then decode each demodulated packet to obtain a corresponding decoded packet.

In the example shown in FIG. 3, the transmitter performs mapping after modulation, and the receiver performs demapping after demodulation. The mapping and modulation order may be swapped, and the demapping and demodulation order may also be swapped. It may be desirable to perform demodulation on each received block. For example, the receiver may derive a channel estimate for each received block based on received pilot symbols from that block and may then perform coherent detection on received data symbols from the block with the channel estimate.

The transmitter may map the K output packets across the M output blocks such that these output packets observe similar channel conditions and have similar probability of correct decoding. The mapping may be performed in various manners and may be dependent on the type of radio resources available for the output blocks.

Figure 4:
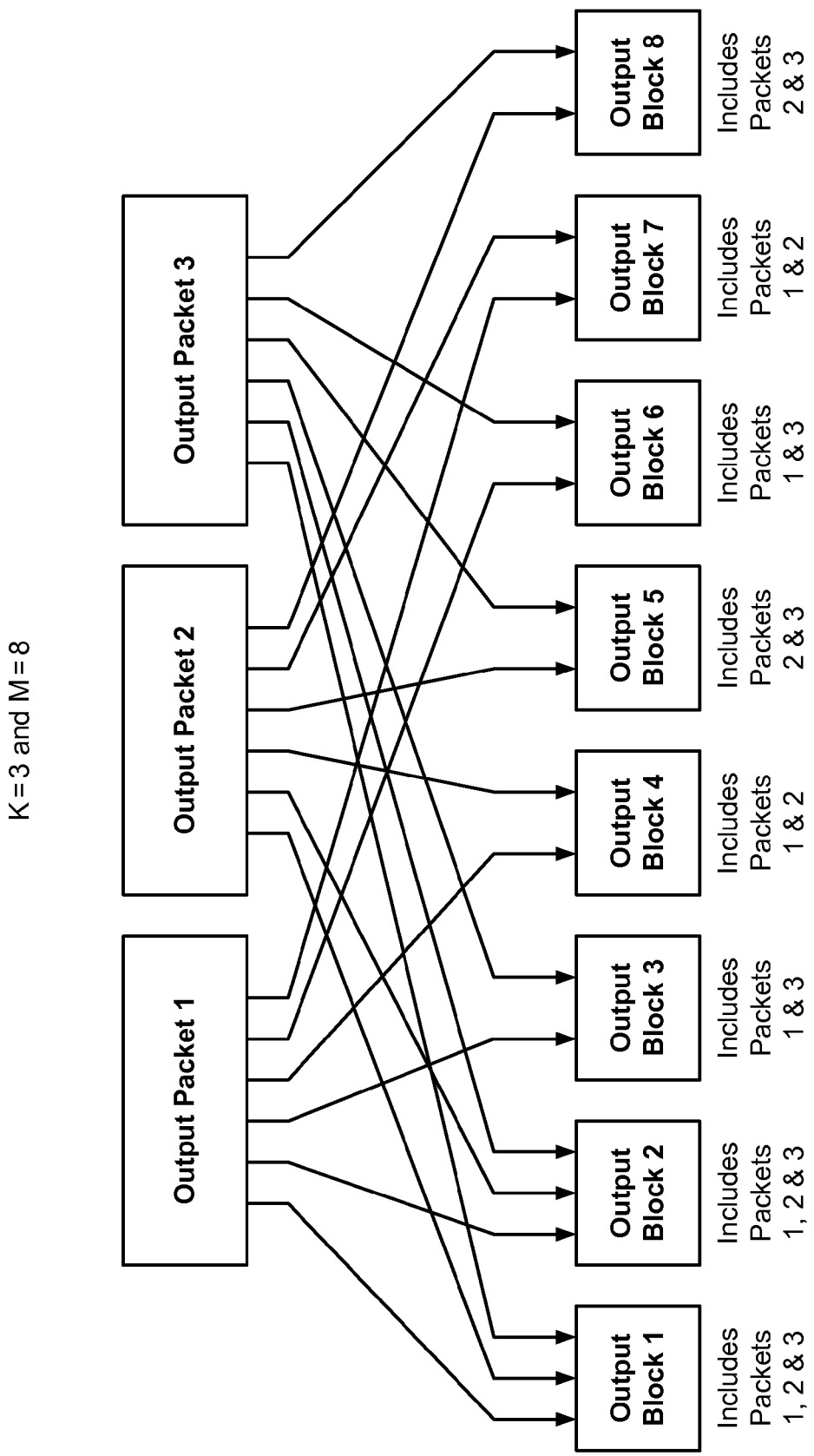
FIG. 4 shows an example of mapping three packets to eight output blocks.

FIG. 4 shows an example of mapping three output packets 1, 2 and 3 to eight output blocks 1 through 8. In this example, each of the first two output blocks 1 and 2 includes all three output packets, and each of the six remaining output blocks 3 through 8 includes two output packets. Each output packet is mapped to six output blocks. In each output block, the data symbols from all output packets mapped to that block may be interleaved or dispersed throughout the block.

FIG. 4 shows an example mapping of output packets to output blocks. In general, the mapping may be defined such that the K output packets are interleaved or dispersed across the M output blocks. Mapping each output packet to a subset of the M output blocks may allow for pipelining of demodulation and decoding at the receiver and may also reduce decoding latency. The amount of pipelining may be dependent on the total number of output blocks (M) and the number of output blocks used for each output packet, e.g., greater pipelining may be achieved for more output blocks and/or fewer output blocks per output packet. The number of output blocks per output packet may be selected to achieve the desired diversity for each output packet.

Figure 5:
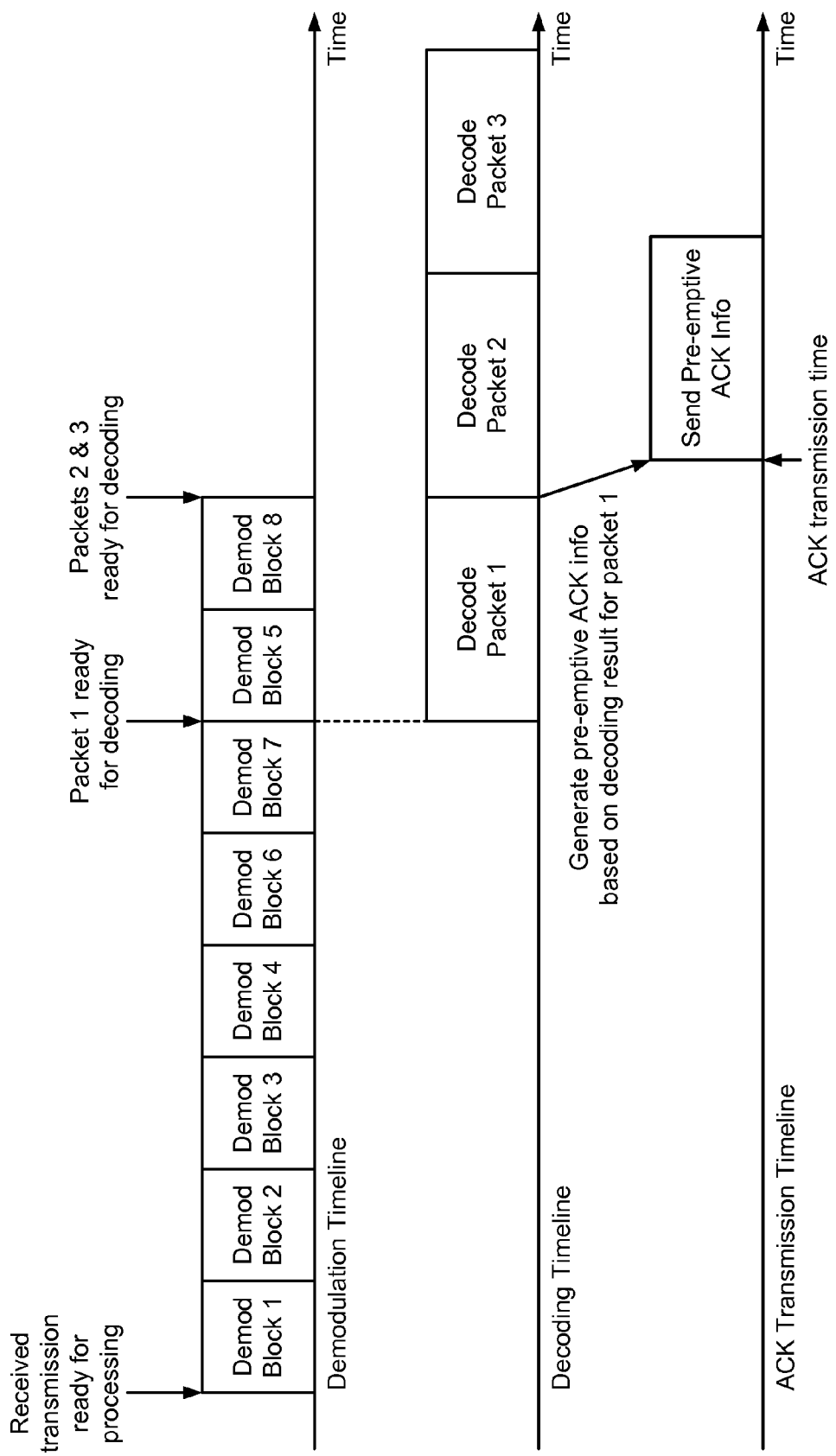
FIG. 5 shows an example of demodulation and decoding for the three packets.

FIG. 5 shows an example of demodulation and decoding for the three packets shown in FIG. 4. The receiver may obtain all M received blocks in a single frame but may demodulate one received block at a time. The receiver may order the M received blocks such that demodulated packets can be obtained for decoding as soon as possible. The receiver may first demodulate the six received blocks 1, 2, 3, 4, 6 and 7 containing demodulated packet 1. The receiver may then decode demodulated packet 1 and may concurrently demodulate the two remaining received blocks 5 and 8. The receiver may decode demodulated packets 2 and 3 in sequential order after completing the decoding for packet 1.

In general, the receiver may generate pre-emptive ACK information at any time prior to completing the decoding for all of the packets. The receiver may also generate the pre-emptive ACK information based on different types of information available at the receiver.

In one design of pre-emptive ACK generation, the receiver may generate pre-emptive ACK information after decoding one or more (L) packets. In this design, the receiver may generate the pre-emptive ACK information based on decoding results for the L decoded packets. In one design, the receiver may set the pre-emptive ACK information to an ACK if all L packets are decoded correctly or to a NAK if any one of the L packets is decoded in error. If the L decoded packets are well interleaved with the remaining K-L packets not yet decoded and if the packet size is sufficiently large, then the probability that some packets are decoded correctly while remaining packets are decoded in error may be small. The pre-emptive ACK information generated based on the L decoded packets may then accurately predict the decoding results for all K packets. In general, the decoding results may comprise decoding status (e.g., whether a packet is decoded correctly or in error based on its CRC), one or more decoding metrics, and/or other information. One decoding metric is a minimum log-likelihood ratio (LLR) after a predetermined number of Turbo decoding iterations. Another decoding metric is a Yamamoto metric, which is based on the difference in a probability of a decoded codeword and a second most likely codeword. If this difference is large, then a "clean decode" may be declared, and another packet will likely be decoded correctly.

The number of packets to decode (L) prior to generating pre-emptive ACK information may be selected based on various factors such as (i) the amount of time available for decoding prior to the ACK transmission time, (ii) the desired accuracy of the pre-emptive ACK information, and/or (iii) other factors. In one design, the L packets may include all packets that can be decoded prior to the ACK transmission time (e.g., as shown in FIG. 5). In another design, the L packets may include a sufficient number of decoded packets to obtain the desired accuracy for the pre-emptive ACK information. In general, more decoded packets may correspond to greater accuracy in the pre-emptive ACK information. In yet another design, the L packets may include a single packet, which may be the first packet decoded by the receiver (e.g., as shown in FIG. 5). This design may simplify implementation since the pre-emptive ACK information may be set to the ACK or NAK for this single packet. In yet another design, the L packets may include a fixed number of decoded packets, e.g., two, three, four, or some other number of decoded packets.

In another design of pre-emptive ACK generation, the receiver may generate pre-emptive ACK information based on information other than decoding results. For example, the receiver may estimate the received signal quality of the transmission received from the transmitter. The received signal quality may be given by a signal-to-noise-and-interference ratio (SINR) or some other metric and may be estimated based on the pilot symbols received from the transmitter. The receiver may generate the pre-emptive ACK information based on the estimated received signal quality. For example, the receiver may compare the estimated received signal quality against a threshold and may set the pre-emptive ACK information to an ACK if the estimated received signal quality exceeds the threshold or to a NAK otherwise. The probability of correctly decoding a packet may be a function of received signal quality. The threshold may be set to a received signal quality value that provides a desired probability of correctly decoding all K packets. This received signal quality value may be determined based on computer simulation, empirical measurement, field testing, etc. The receiver may also estimate the capacity of the communication link from the transmitter to the receiver and may generate the pre-emptive ACK information based on the estimated capacity. In any case, this pre-emptive ACK generation design may be used for various scenarios such as when only one packet is sent, when there is insufficient time to decode any packet before the ACK transmission time, etc.

In general, the receiver may generate pre-emptive ACK information based on decoding results for one or more decoded packets, estimated received signal quality, estimated capacity, some other information, or any combination thereof. The receiver may also generate pre-emptive ACK information based on different information in different scenarios. For example, the amount of time available for decoding prior to the ACK transmission time may vary depending on the number of packets being sent, the mapping of packets to output blocks, etc. The receiver may generate pre-emptive ACK information based on decoding results when the available decoding time is sufficiently long and based on estimated received signal quality or estimated capacity when the available decoding time is too short to decode any packet prior to the ACK transmission time.

The receiver may send pre-emptive ACK information to indicate an ACK for all K packets but may thereafter decode a packet in error. The pre-emptive ACK information would then be in error and would be the same as a NAK-to-ACK error caused by the receiver sending a NAK but the transmitter receiving an ACK due to impairments in the communication link. The system may have a target NAK-to-ACK error rate, which may be $10^{-3}$ or some other value. The pre-emptive ACK error rate may be designed to be similar to or lower than the NAK-to-ACK error rate in order to mitigate the adverse impact to performance due to pre-emptive ACK errors.

Appropriate actions may be taken for a pre-emptive ACK error. For data transmission on the reverse link, a base station may send a pre-emptive ACK but may be unable to decode remaining packets. In such a case, the base station may schedule a retransmission of the packets decoded in error. This may be particularly useful in a system in which retransmissions can be scheduled easily. For data transmission on the forward link, a terminal may send a pre-emptive ACK but may be unable to decode remaining packets. The terminal may then request a retransmission via either a physical layer channel or an upper layer protocol.

Figure 6:
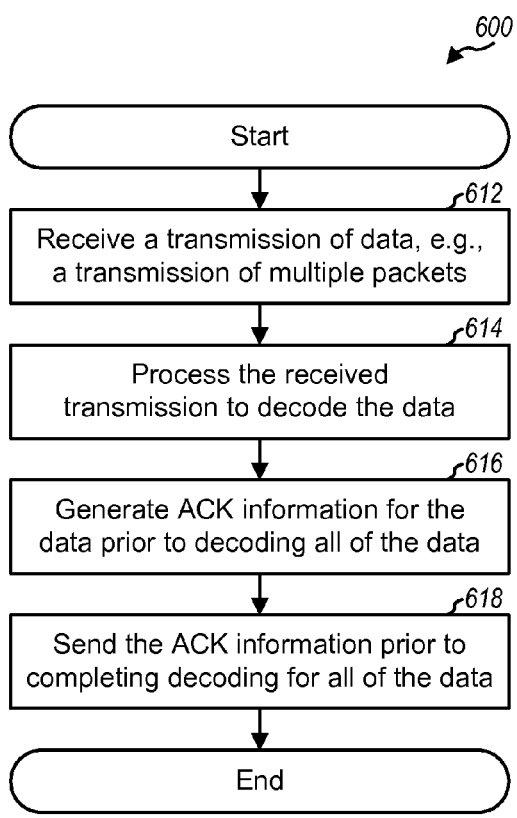
FIG. 6 shows a process for receiving data with pre-emptive ACK information.

FIG. 6 shows a design of a process 600 for receiving data with pre-emptive ACK information. Process 600 may be performed by a receiver, which may be terminal 110 for data transmission on the forward link, base station 120 for data transmission on the reverse link, or some other entity.

The receiver may receive a transmission of data from a transmitter (block 612) and may process the received transmission to decode the data (block 614). For block 614, the receiver may demodulate the received transmission to obtain demodulated data and may then decode the demodulated data to obtain decoded data. The receiver may generate ACK information for the data prior to decoding all of the data (block 616). The receiver may send the ACK information at a designated ACK transmission time prior to completing decoding for all of the data (block 618).

In one design of block 616, the receiver may generate the ACK information based on decoding results for a portion of the data. In another design of block 616, the receiver may generate the ACK information based on estimated received signal quality for the received transmission or estimated capacity. For both designs, the receiver may generate the ACK information to achieve a target NAK-to-ACK error rate.

In one design, the receiver may receive a transmission of multiple packets in block 612 and may generate ACK information for the multiple packets prior to decoding all of the packets in block 616. The receiver may generate the ACK information after decoding L packets among the multiple (K) packets, where L is one or greater and is less than K. The receiver may set the ACK information to an ACK if all of the L packets are decoded correctly or to a NAK if any one of the L packets is decoded in error. The L packets may comprise a single packet decoded first among the multiple packets. The L packets may also comprise all packets decoded prior to the ACK transmission time.

Figure 7:
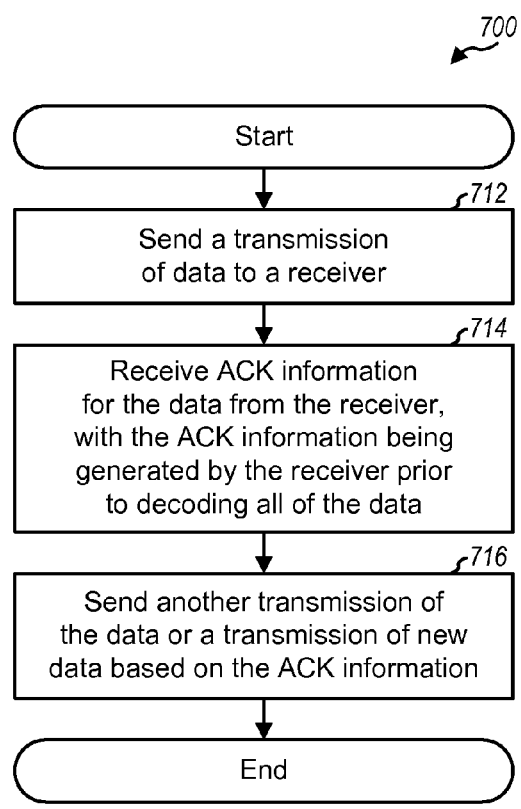
FIG. 7 shows a process for transmitting data with pre-emptive ACK information.

FIG. 7 shows a design of a process 700 for transmitting data with pre-emptive ACK information. Process 700 may be performed by a transmitter, which may be terminal 110 for data transmission on the reverse link, base station 120 for data transmission on the forward link, or some other entity.

The transmitter may send a transmission of data to a receiver (block 712). The transmitter may receive ACK information for the data from the receiver, with the ACK information being generated by the receiver prior to decoding all of the data (block 714). The transmitter may send another transmission of the data or a transmission of new data based on the ACK information (block 716). For block 716, the transmitter may send another transmission of the data if the ACK information comprises a NAK and may send a transmission of new data if the ACK information comprises an ACK.

In one design of block 712, the transmitter may send a transmission of multiple (K) packets. The transmitter may process the multiple packets to achieve similar probability of correct decoding for these packets. In one design, the transmitter may encode and modulate each of the multiple packets based on a common modulation and coding scheme to obtain a respective one of multiple output packets. The transmitter may then map the multiple output packets across multiple output blocks. For block 714, the transmitter may receive ACK information for the multiple packets, with the ACK information being generated by the receiver based on decoding results for L packets among the multiple packets, where L is one or greater and is less than K.

Pre-emptive ACK information may be used for data transmission with Hybrid Automatic Repeat reQuest (HARQ). For HARQ, the transmitter may send a transmission of a packet to the receiver and may send one or more additional transmissions until the packet is decoded correctly by the receiver, or the maximum number of transmissions has been sent, or some other termination condition is encountered. HARQ may improve reliability of data transmission.

In another aspect, the receiver may receive a transmission of K packets, decode a packet in error, and skip decoding for the remaining packets. The K packets may have similar probability of correct decoding, as discussed above. In this case, if the receiver encounters a decoding error for a packet, then the likelihood of decoding a remaining packet in error may be great. The receiver may conserve decoding resources as well as battery power by not decoding the remaining packets after encountering a decoding error.

The receiver may send a NAK if any packet is decoded in error. In one design, the transmitter may resend all K packets upon receiving the NAK from the receiver. In this design, skipping decoding for the remaining packets may not adversely impact performance since the transmitter would resend all K packets even if one or more of the remaining packets are decoded correctly. In another design, the transmitter may resend only packets decoded in error, instead of all K packets. In this design, skipping decoding for the remaining packets may minimally impact performance since these packets may be decoded in error with high probability. For both designs, the receiver may wait for the next transmission of the remaining packets and then decode each remaining packet based on all transmissions received for that packet.

Figure 8:
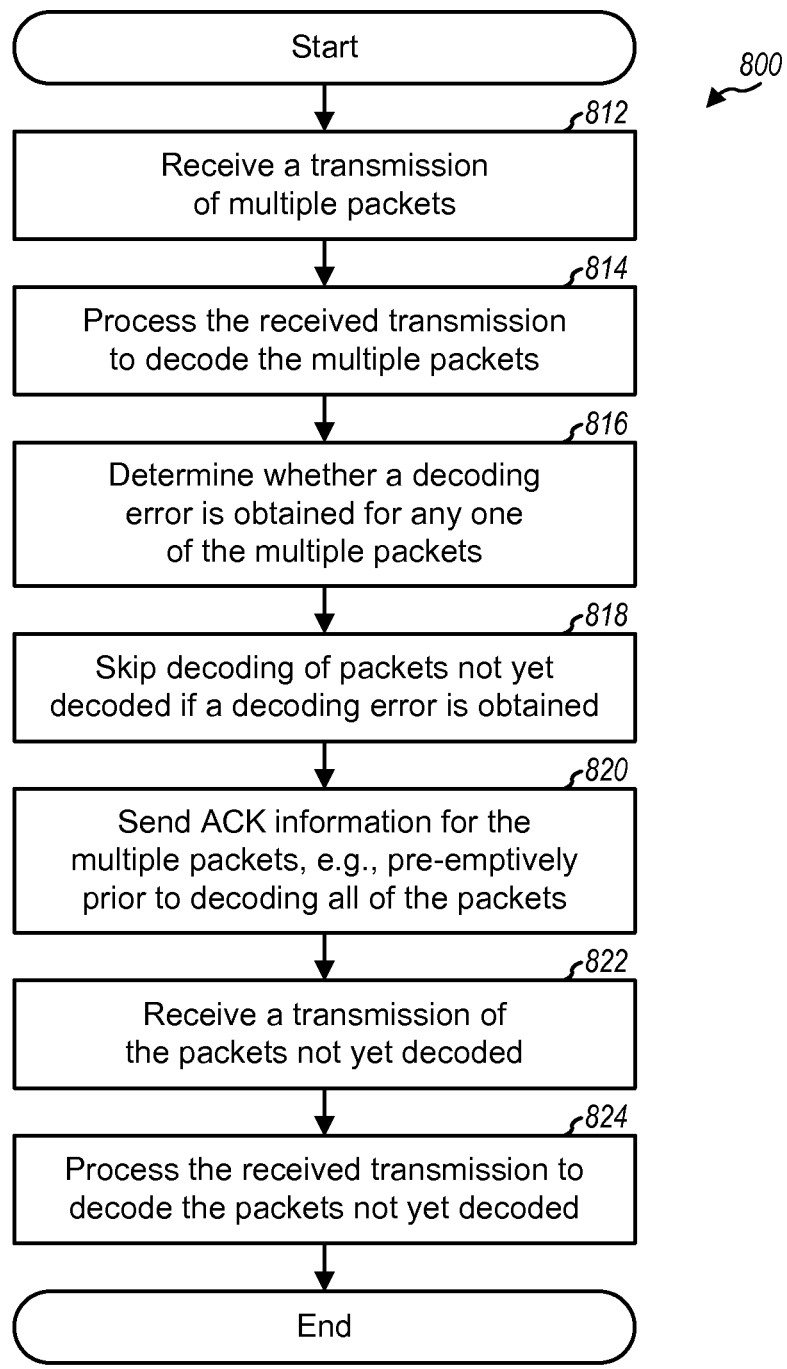
FIG. 8 shows a process for terminating decoding due to a decoding error.

FIG. 8 shows a design of a process 800 for receiving data with termination of decoding due to a decoding error. Process 800 may be performed by a receiver, e.g., terminal 110 or base station 120. The receiver may receive a transmission of multiple packets from a transmitter (block 812) and may process the received transmission to decode the multiple packets (block 814). The receiver may determine whether a decoding error is obtained for any one of the multiple packets (block 816). The receiver may skip decoding of packets not yet decoded if a decoding error is obtained (block 818).

In one design, the receiver may process the received transmission to decode the multiple packets in a sequential order, one packet at a time. Upon encountering a first packet decoded in error, the receiver may skip decoding for remaining ones of the multiple packets. In general, the receiver may decode one or several packets in parallel, depending on the decoding resources at the receiver. The receiver may skip decoding for all remaining packets upon obtaining a decoding error for any packet.

The receiver may send ACK information for the multiple packets, e.g., pre-emptively prior to decoding all of the packets (820). The receiver may receive a transmission of the packets not yet decoded and possibly other packets (block 822). The receiver may process the received transmission to decode the packets not yet decoded (block 824). The receiver may decode each packet based on all transmissions received for that packet.

The generation of pre-emptive ACK information and the termination of decoding due to a decoding error may be implemented independently of one another. The receiver may generate pre-emptive ACK information and may either (i) decode all packets regardless of decoding results or (ii) terminate decoding when a decoding error is encounter. The receiver may also terminate decoding when a decoding error is encounter and may either (i) generate and send pre-emptive ACK information prior to completing decoding for all packets or (ii) generate and send ACK information after completing decoding for all packets.

Figure 9:
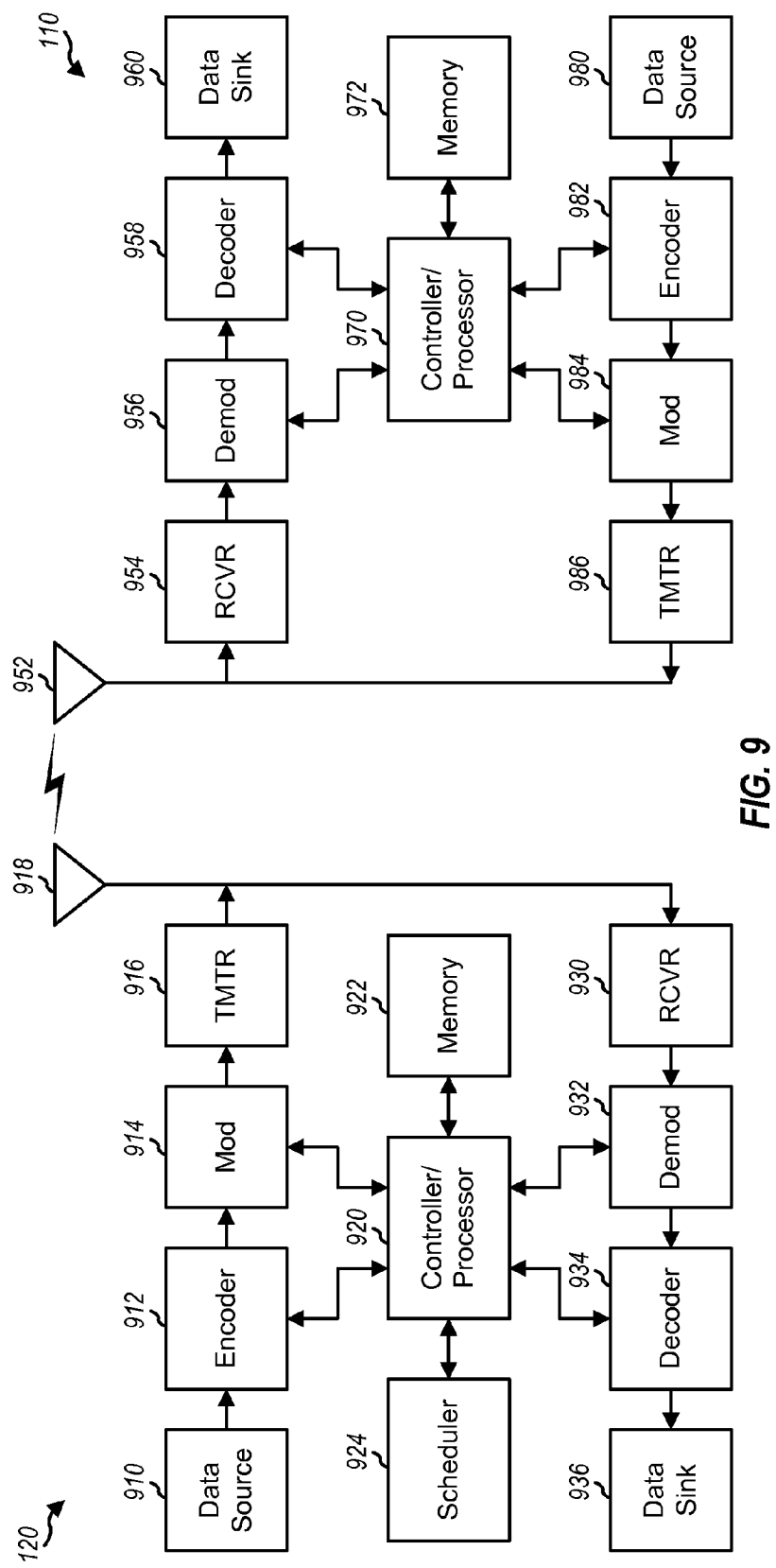
FIG. 9 shows a block diagram of a terminal and a base station.

FIG. 9 shows a block diagram of a design of base station 120 and terminal 110 in FIG. 1. For data transmission on the forward link, at base station 120, an encoder 912 receives data from a data source 910, generates one or more packets, and encodes each packet to obtain a coded packet. A modulator (Mod) 914 receives coded packets from encoder 912, modulates the coded packets, and maps the modulated packets to output blocks. Modulator 914 may also perform modulation for OFDM, CDMA, etc. A transmitter unit (TMTR) 916 processes the output blocks from modulator 914 and generates a forward link signal, which is transmitted via an antenna 918.

At terminal 110, the forward link signal from base station 120 is received by an antenna 952 and processed by a receiver unit (RCVR) 954 to obtain samples. A demodulator (Demod) 956 processes the samples (e.g., for OFDM, CDMA, etc.) to obtain received symbols, demodulates the received symbols for each output block, demaps the demodulated blocks, and provides demodulated packets. A decoder 958 decodes each demodulated packet and checks each decoded packet. Decoder 958 provides the status of each decoded packet to a controller/processor 970 and provides the packet (if decoded correctly) to a data sink 960. The processing by demodulator 956 and decoder 958 at terminal 110 is complementary to the processing by modulator 914 and encoder 912, respectively, at base station 120.

On the reverse link, ACK information for packets is encoded by an encoder 982, further processed by a modulator 984, and conditioned by a transmitter unit 986 to generate a reverse link signal, which is transmitted via antenna 952. At base station 120, the reverse link signal is received by antenna 918 and processed by a receiver unit 930 to obtain samples. A demodulator 932 processes the samples and provides demodulated symbols. A decoder 934 further processes the demodulated symbols and provides the ACK information. A controller/processor 920 directs transmission of pending and new packets based on the ACK information received from terminal 110. Data transmission on the reverse link may occur in a manner analogous to the data transmission on the forward link.

Controllers/processors 920 and 970 may direct the operation at base station 120 and terminal 110, respectively. Controller/processor 920 and/or 970 may implement or direct process 600 in FIG. 6, process 700 in FIG. 7, process 800 in FIG. 8, and/or other processes for the techniques described herein. Memories 922 and 972 store program codes and data for base station 120 and terminal 110, respectively. A scheduler 924 schedules data transmission on the forward and reverse links and assigns radio resources to terminals scheduled for data transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of receiving data, comprising: receiving a transmission of data, the data comprising multiple packets; processing the received transmission to decode the multiple packets; and
generating pre-emptive acknowledgement (ACK) information for the multiple packets prior to decoding all of the multiple packets,
wherein the generating pre-emptive ACK information for the multiple packets comprises generating pre-emptive ACK information for the multiple packets after decoding L packets among the multiple (K) packets, where L is one or greater and is less than K, and L is selected based on an amount of time available for the decoding of the L packets prior to a corresponding ACK transmission time, wherein the L packets may include a sufficient number of decoded packets to obtain the desired accuracy for the pre-emptive ACK information, wherein more decoded packets corresponds to greater accuracy in the pre-emptive ACK information; and
wherein the pre-emptive ACK information is set to an ACK if all of the L packets are decoded correctly and set to a negative acknowledgment (NAK) if any one of the L packets is decoded in error.

2. The method of claim 1, further comprising:
sending the pre-emptive ACK information prior to completing decoding for all of the data.

3. The method of claim 1, wherein the generating pre-emptive ACK information for the data comprises generating the pre-emptive ACK information based on decoding results for a portion of the data.

4. The method of claim 1, wherein the generating pre-emptive ACK information for the data comprises generating the pre-emptive ACK information based on estimated received signal quality for the received transmission.

5. The method of claim 4, wherein the generating the pre-emptive ACK information based on the estimated received signal quality comprises setting the pre-emptive ACK information to an ACK if the estimated received signal quality meets or exceeds a threshold, and setting the pre-emptive ACK information to a negative acknowledgement (NAK) if the estimated received signal quality is below the threshold.

6. The method of claim 1, wherein the generating pre-emptive ACK information for the data comprises generating the pre-emptive ACK information based on estimated capacity.

7. The method of claim 1, wherein the generating pre-emptive ACK information for the data comprises generating the pre-emptive ACK information to be less than or equal to a target NAK-to-ACK error rate.

8. The method of claim 1, wherein the L packets comprise a single packet decoded first among the multiple packets.

9. The method of claim 1, wherein the L packets comprise all packets decoded prior to transmission time for the pre-emptive ACK information.

10. The method of claim 1, wherein the processing the received transmission comprises demodulating the received transmission to obtain demodulated data, and decoding the demodulated data to obtain decoded data.

11. An apparatus for communication, comprising:
at least one processor configured to receive a transmission of data comprising multiple (K) packets, to process the received transmission to decode the multiple packets, and to generate pre-emptive acknowledgement (ACK) information for the multiple packets prior to decoding all of the multiple packets,
wherein the at least one processor is configured to generate pre-emptive ACK information for the multiple packets after decoding L packets among the multiple packets, where L is one or greater and is less than K, and L is selected based on an amount of time available for the decoding of the L packets prior to a corresponding ACK transmission time,
wherein the L packets may include a sufficient number of decoded packets to obtain the desired accuracy for the pre-emptive ACK information, wherein more decoded packets corresponds to greater accuracy in the pre-emptive ACK information; and
wherein the pre-emptive ACK information is set to an ACK if all of the L packets are decoded correctly and set to a negative acknowledgment (NAK) if any one of the L packets is decoded in error.

12. An apparatus for receiving data, comprising:
means for receiving a transmission of data comprising multiple (K) packets;
means for processing the received transmission to decode the multiple packets; and
means for generating pre-emptive acknowledgement (ACK) information for the multiple packets prior to decoding all of the multiple packets, wherein the means for generating pre-emptive ACK information for the data comprises means for generating pre-emptive ACK information for the multiple packets after decoding L packets among the multiple packets, where L is one or greater and is less than K, and L is selected based on an amount of time available for the decoding of the L packets prior to a corresponding ACK transmission time, wherein the L packets may include a sufficient number of decoded packets to obtain the desired accuracy for the pre-emptive ACK information, wherein more decoded packets corresponds to greater accuracy in the pre-emptive ACK information; and wherein the pre-emptive ACK information is set to an ACK if all of the L packets are decoded correctly and set to a negative acknowledgment (NAK) if any one of the L packets is decoded in error.

13. A computer program product, comprising: a non-transitory computer-readable medium comprising:

code for causing at least one computer to receive a transmission of data comprising multiple (K) packets;

code for causing the at least one computer to process the received transmission to decode the multiple packets;

code for causing the at least one computer to generate pre-emptive acknowledgement (ACK) information for the multiple packets prior to decoding all of the multiple packets, and code for causing the at least one computer to generate the pre-emptive ACK information for the multiple packets after decoding L packets among the multiple packets, where L is one or greater and is less than K, and L is selected based on an amount of time available for the decoding of the L packets prior to a corresponding ACK transmission time, wherein the L packets may include a sufficient number of decoded packets to obtain the desired accuracy for the pre-emptive ACK information, wherein more decoded packets corresponds to greater accuracy in the pre-emptive ACK information; and wherein the pre-emptive ACK information is set to an ACK if all of the L packets are decoded correctly and set to a negative acknowledgment (NAK) if any one of the L packets is decoded in error.

14. A method of transmitting data, comprising:

sending a transmission of data to a receiver, the data comprising multiple (K) packets;

receiving pre-emptive acknowledgement (ACK) information for the data from the receiver, the pre-emptive ACK information being generated by the receiver for the multiple packets prior to decoding all of the multiple packets; and sending another transmission of the data or a transmission of new data based on the pre-emptive ACK information, wherein the pre-emptive ACK information is generated by the receiver based on decoding results for L packets among the multiple packets, where L is one or greater and is less than K, and L is selected based on an amount of time available for decoding of the L packets prior to a corresponding ACK transmission time, wherein the L packets may include a sufficient number of decoded packets to obtain the desired accuracy for the pre-emptive ACK information, wherein more decoded packets corresponds to greater accuracy in the pre-emptive ACK information; and wherein the pre-emptive ACK information is set to an ACK if all of the L packets are decoded correctly and set to a negative acknowledgment (NAK) if any one of the L packets is decoded in error.

15. The method of claim 14, further comprising:
processing the multiple packets to achieve similar probability of correct decoding for the multiple packets.

16. The method of claim 14, further comprising:
encoding and modulating each of the multiple packets based on a common modulation and coding scheme to obtain a respective one of multiple output packets; and
mapping the multiple output packets across multiple output blocks.

17. The method of claim 14, wherein the sending another transmission of the data or a transmission of new data comprises sending another transmission of the data if the pre-emptive ACK information comprises a negative acknowledgement (NAK), and sending a transmission of new data if the pre-emptive ACK information comprises an ACK.

18. An apparatus for communication, comprising:

at least one processor configured to send a transmission of data to a receiver wherein the data comprising multiple (K) packets, to receive pre-emptive acknowledgement (ACK) information for the multiple packets from the receiver, the pre-emptive ACK information being generated by the receiver for the multiple packets prior to decoding all of the multiple packets, and to send another transmission of the data or a transmission of new data based on the pre-emptive ACK information, wherein the pre-emptive ACK information is generated by the receiver based on decoding results for L packets among the multiple packets, where L is one or greater and is less than K, and L is selected based on an amount of time available for decoding of the L packets prior to a corresponding ACK transmission time, wherein the L packets may include a sufficient number of decoded packets to obtain the desired accuracy for the pre-emotive ACK information, wherein more decoded packets corresponds to greater accuracy in the pre-emotive ACK information; and wherein the pre-emptive ACK information is set to an ACK if all of the L packets are decoded correctly and set to a negative acknowledgment (NAK) if any one of the L packets is decoded in error.

19. The apparatus of claim 18, wherein the at least one processor is configured to encode and modulate each of the multiple packets based on a common modulation and coding scheme to obtain a respective one of multiple output packets, and to map the multiple output packets across multiple output blocks.

20. The apparatus of claim 18, wherein the at least one processor is configured to send another transmission of the data if the pre-emptive ACK information comprises a negative acknowledgement (NAK), and to send a transmission of new data if the pre-emptive ACK information comprises an ACK.

21. A method of receiving data, comprising:

receiving a transmission of multiple packets;

processing the received transmission to decode the multiple (K) packets;

determining, after decoding L packets among the multiple (K) packets, whether a decoding error is obtained for any one of the L decoded packets, where L is one or greater and is less than K, and L is selected based on an amount of time available for the decoding of the L packets prior to a corresponding ACK transmission time;

skipping decoding of packets not yet decoded if the decoding error is obtained;

wherein the L packets may include a sufficient number of decoded packets to obtain the desired accuracy for the pre-emptive ACK information, wherein more decoded packets corresponds to greater accuracy in the pre-emptive ACK information;

and sending pre-emptive acknowledgment (ACK) information for the multiple packets prior to decoding all of the multiple packets if no decoding error is obtained for any of the L decoded packets.

22. The method of claim 21, wherein the processing the received transmission comprises processing the received transmission to decode the multiple packets in a sequential order, one packet at a time, and wherein decoding for remaining ones of the multiple packets is skipped upon encountering a first packet decoded in error.

23. The method of claim 21, further comprising: receiving a transmission of the packets not yet decoded; and processing the received transmission to decode the packets not yet decoded.

24. An apparatus for communication, comprising:
at least one processor configured to receive a transmission of multiple packets, to process the received transmission to the multiple (K) packets, to determine whether a decoding error is obtained for any one of the L decoded packets, where L is one or greater and is less than K, to skip decoding of packets not yet decoded if the decoding error is obtained, and to send pre-emptive acknowledgment (ACK) information for the multiple packets prior to decoding all of the multiple packets if no decoding error is obtained for any of the L decoded packets,
wherein the L packets may include a sufficient number of decoded packets to obtain the desired accuracy for the pre-emptive ACK information, wherein more decoded packets corresponds to greater accuracy in the pre-emptive ACK information;
and L is selected based on an amount of time available for decoding of the L packets prior to a corresponding ACK transmission time.

25. The apparatus of claim 24, wherein the at least one processor is configured to process the received transmission to decode the multiple packets in a sequential order, one packet at a time, and to skip decoding for remaining ones of the multiple packets upon encountering a first packet decoded in error.

26. The apparatus of claim 24, wherein the at least one processor is configured to receive a transmission of the packets not yet decoded, and to process the received transmission to decode the packets not yet decoded.

27. The apparatus of claim 11, further wherein the at least one processor is further configured to send the pre-emptive ACK information prior to completing decoding for all of the data.

28. The apparatus of claim 11, wherein the at least one processor is configured to generate the pre-emptive ACK information for the data based on decoding results for a portion of the data.

29. The apparatus of claim 11, wherein the at least one processor is configured to generate the pre-emptive ACK information based on estimated received signal quality for the received transmission.

30. The apparatus of claim 29, wherein the generating the pre-emptive ACK information based on the estimated received signal quality comprises setting the pre-emptive ACK information to an ACK if the estimated received signal quality meets or exceeds a threshold, and setting the pre-emptive ACK information to a negative acknowledgement (NAK) if the estimated received signal quality is below the threshold.

31. The apparatus of claim 11, wherein the at least one processor is configured to generate the pre-emptive ACK information based on estimated capacity.

32. The apparatus of claim 11, wherein at least one processor is configured to generate the pre-emptive ACK information to be less than or equal to a target NAK-to-ACK error rate.

33. The apparatus of claim 11, wherein the L packets comprise a single packet decoded first among the multiple packets.

34. The apparatus of claim 11, wherein the L packets comprise all packets decoded prior to transmission time for the pre-emptive ACK information.

35. The apparatus of claim 11, wherein the at least one processor is configured to process the received transmission by demodulating the received transmission to obtain demodulated data, and decoding the demodulated data to obtain decoded data.

36. The method of claim 1, wherein generating pre-emptive ACK information for the multiple packets prior to decoding all of the multiple packets comprises generating a single ACK for all of the multiple packets.

37. An apparatus for transmitting data, comprising:
means for sending a transmission of data to a receiver, the data comprising multiple (K) packets;
means for receiving pre-emptive acknowledgement (ACK) information for the data from the receiver, the pre-emptive ACK information being generated by the receiver for the multiple packets prior to decoding all of the multiple packets; and
means for sending another transmission of the data or a transmission of new data based on the pre-emptive ACK information,
wherein the pre-emptive ACK information is generated by the receiver based on decoding results for L packets among the multiple packets, where L is one or greater and is less than K, and L is selected based on an amount of time available for decoding of the L packets prior to a corresponding ACK transmission time, and
wherein the L packets may include a sufficient number of decoded packets to obtain the desired accuracy for the pre-emotive ACK information, wherein more decoded packets corresponds to greater accuracy in the pre-emptive ACK information;
wherein the pre-emptive ACK information is set to an ACK if all of the L packets are decoded correctly and set to a negative acknowledgment (NAK) if any one of the L packets is decoded in error.

38. A computer program product, comprising: a non-transitory computer-readable medium comprising:
code for causing at least one computer to send a transmission of data to a receiver, the data comprising multiple (K) packets;
code for causing the at least one computer to receive pre-emptive acknowledgement (ACK) information for the data from the receiver, the pre-emptive ACK information being generated by the receiver for the multiple packets prior to decoding all of the multiple packets;
and code for causing the at least one computer to send another transmission of the data or a transmission of new data based on the pre-emptive ACK information,
wherein the pre-emptive ACK information is generated by the receiver based on decoding results for L packets among the multiple packets, where L is one or greater and is less than K, and L is selected based on an amount of time available for decoding of the L packets prior to a corresponding ACK transmission time, wherein the L packets may include a sufficient number of decoded packets to obtain the desired accuracy for the pre-emptive ACK information, wherein more decoded packets corresponds to greater accuracy in the pre-emptive ACK information; and wherein the pre-emptive ACK information is set to an ACK if all of the L packets are decoded correctly and set to a negative acknowledgment (NAK) if any one of the L packets is decoded in error.

39. An apparatus for receiving data, comprising:

means for receiving a transmission of multiple packets;
means for processing the received transmission to decode the multiple (K) packets;
means for determining, after decoding L packets among the multiple (K) packets, whether a decoding error is obtained for any one of the L decoded packets, where L is one or greater and is less than K, and L is selected based on an amount of time available for decoding of the L packets prior to a corresponding ACK transmission time;
wherein the L packets may include a sufficient number of decoded packets to obtain the desired accuracy for the pre-emptive ACK information, wherein more decoded packets corresponds to greater accuracy in the pre-emptive ACK information;
means for skipping decoding of packets not yet decoded if the decoding error is obtained; and means for sending pre-emptive acknowledgment (ACK) information for the multiple packets prior to decoding all of the multiple packets if no decoding error is obtained for any of the L decoded packets.

40. A computer program product, comprising: a non-transitory computer-readable medium comprising:

code for causing at least one computer to receive a transmission of multiple packets;
code for causing the at least one computer to process the received transmission to decode the multiple (K) packets;
code for causing the at least one computer to determine, after decoding L packets among the multiple (K) packets, whether a decoding error is obtained for any one of the L decoded packets, where L is one or greater and is less than K, and L is selected based on an amount of time available for decoding of the L packets prior to a corresponding ACK transmission time;
code for causing the at least one computer to skip decoding of packets not yet decoded if the decoding error is obtained; wherein the L packets may include a sufficient number of decoded packets to obtain the desired accuracy for the pre-emptive ACK information, wherein more decoded packets corresponds to greater accuracy in the pre-emptive ACK information; and
code for causing the at least one computer to send pre-emptive acknowledgment (ACK) information for the multiple packets prior to decoding all of the multiple packets if no decoding error is obtained for any of the L decoded packets.

* * * * *